(No Model.) 9 Sheets—Sheet 1.
C. B. ANDERSSON.
NUT MACHINE.
No. 370,515. Patented Sept. 27, 1887.
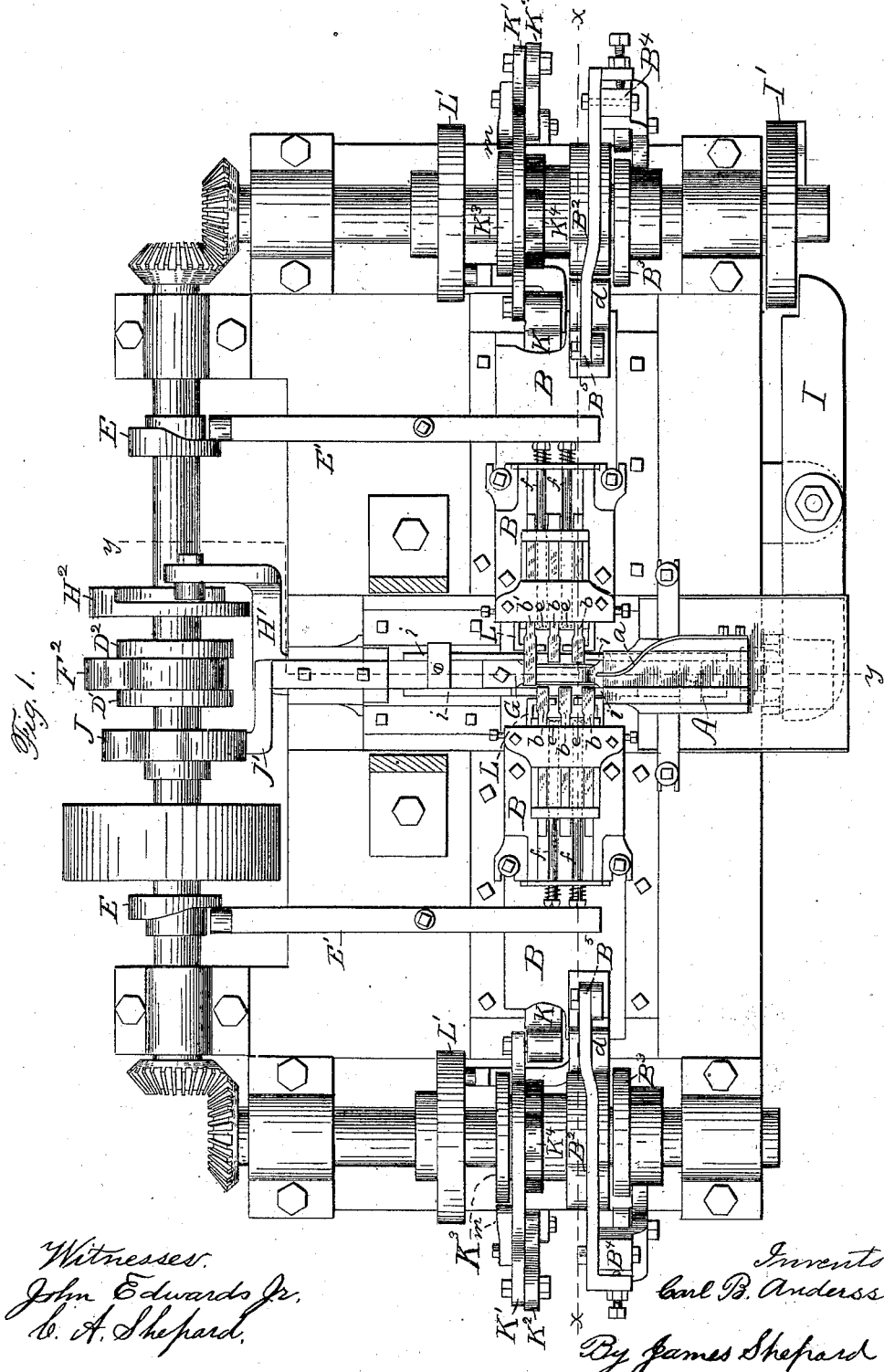
Witnesses:
John Edwards Jr.
C. A. Shepard
Inventor,
Carl B. Andersson
By James Shepard
atty.

(No Model.) 9 Sheets—Sheet 2.
C. B. ANDERSSON.
NUT MACHINE.
No. 370,515. Patented Sept. 27, 1887.
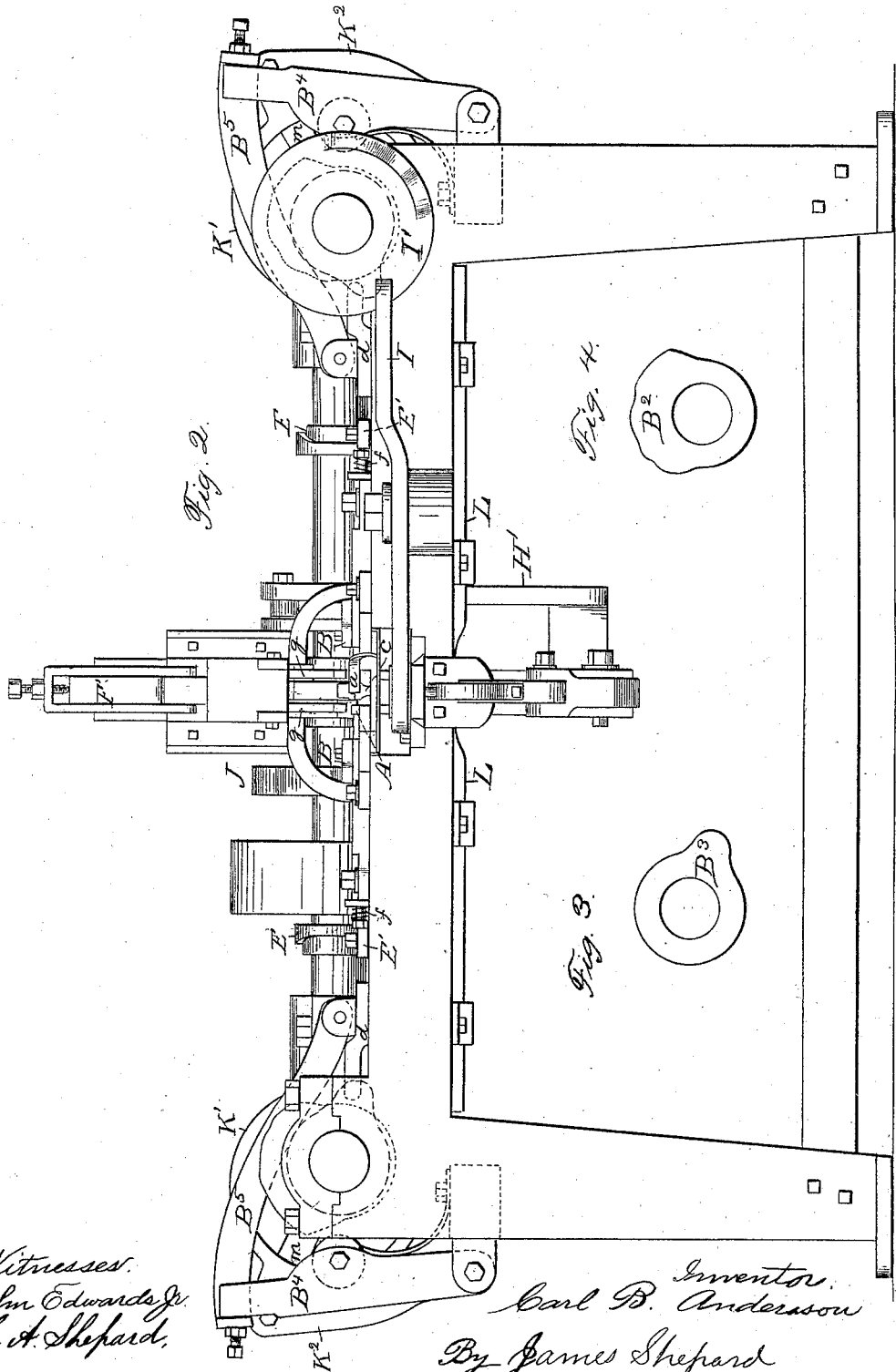
Witnesses.
John Edwards Jr.
C. A. Shepard.
Inventor.
Carl B. Andersson
By James Shepard
Atty

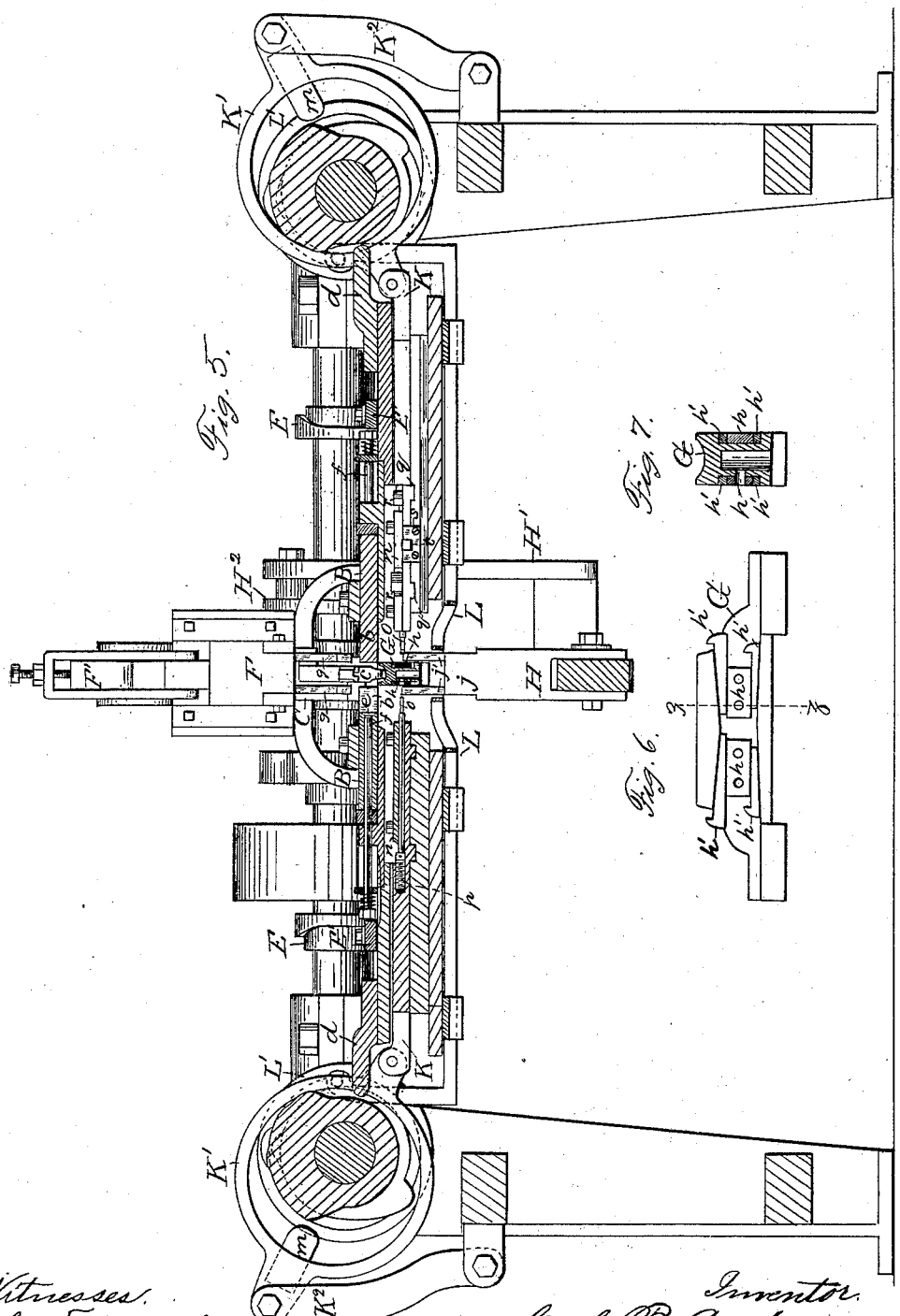

(No Model.) 9 Sheets—Sheet 4.
C. B. ANDERSSON.
NUT MACHINE.
No. 370,515. Patented Sept. 27, 1887.
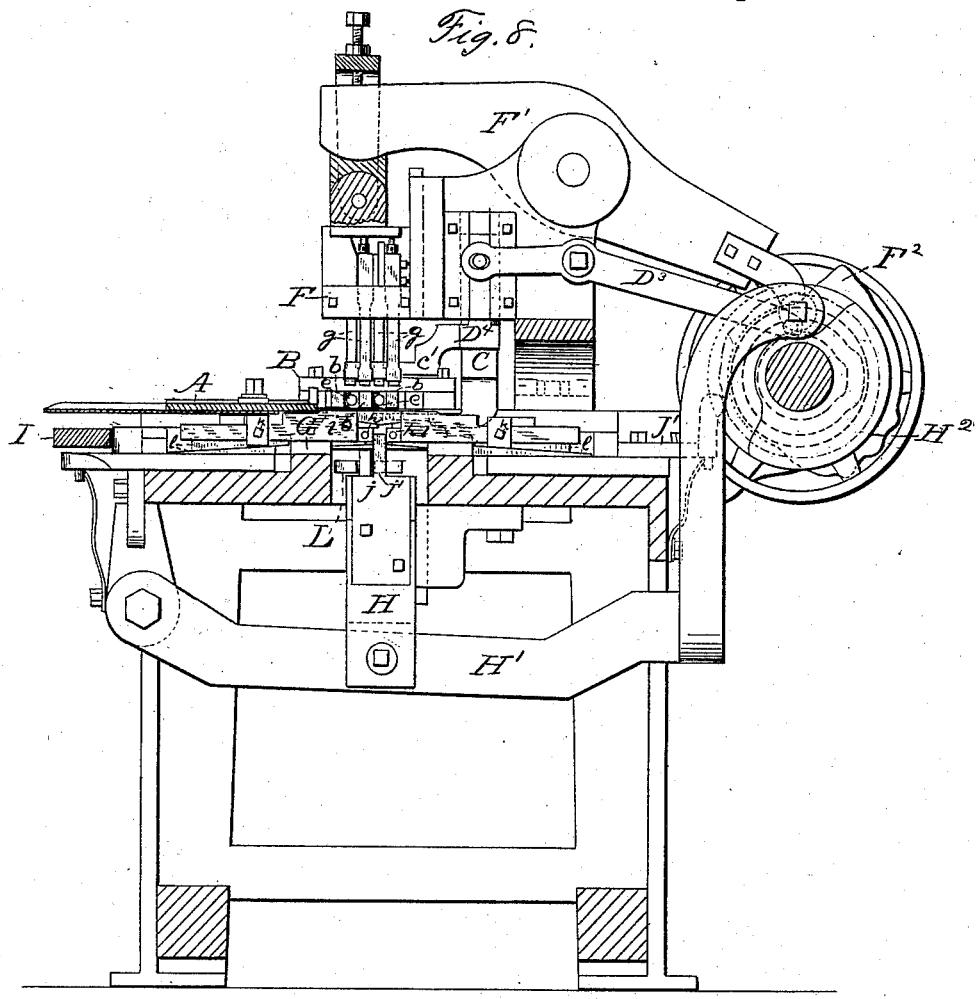
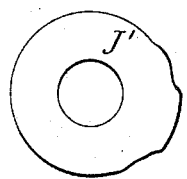
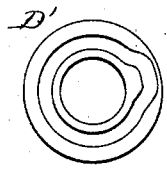
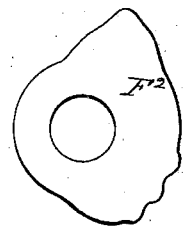
Witnesses,
John Edwards Jr.
C. A. Shepard
Inventor,
Carl B. Andersson
By James Shepard
Atty.

(No Model.) 9 Sheets—Sheet 5.

C. B. ANDERSSON.
NUT MACHINE.

No. 370,515. Patented Sept. 27, 1887.

Witnesses
John Edwards Jr.
C. A. Shepard.

Inventor
Carl B. Andersson
By James Shepard
Atty.

(No Model.) 9 Sheets—Sheet 6.

C. B. ANDERSSON.
NUT MACHINE.

No. 370,515. Patented Sept. 27, 1887.

Witnesses
John Edwards Jr.
C. A. Shepard

Inventor
Carl B. Andersson,
By James Shepard
Atty.

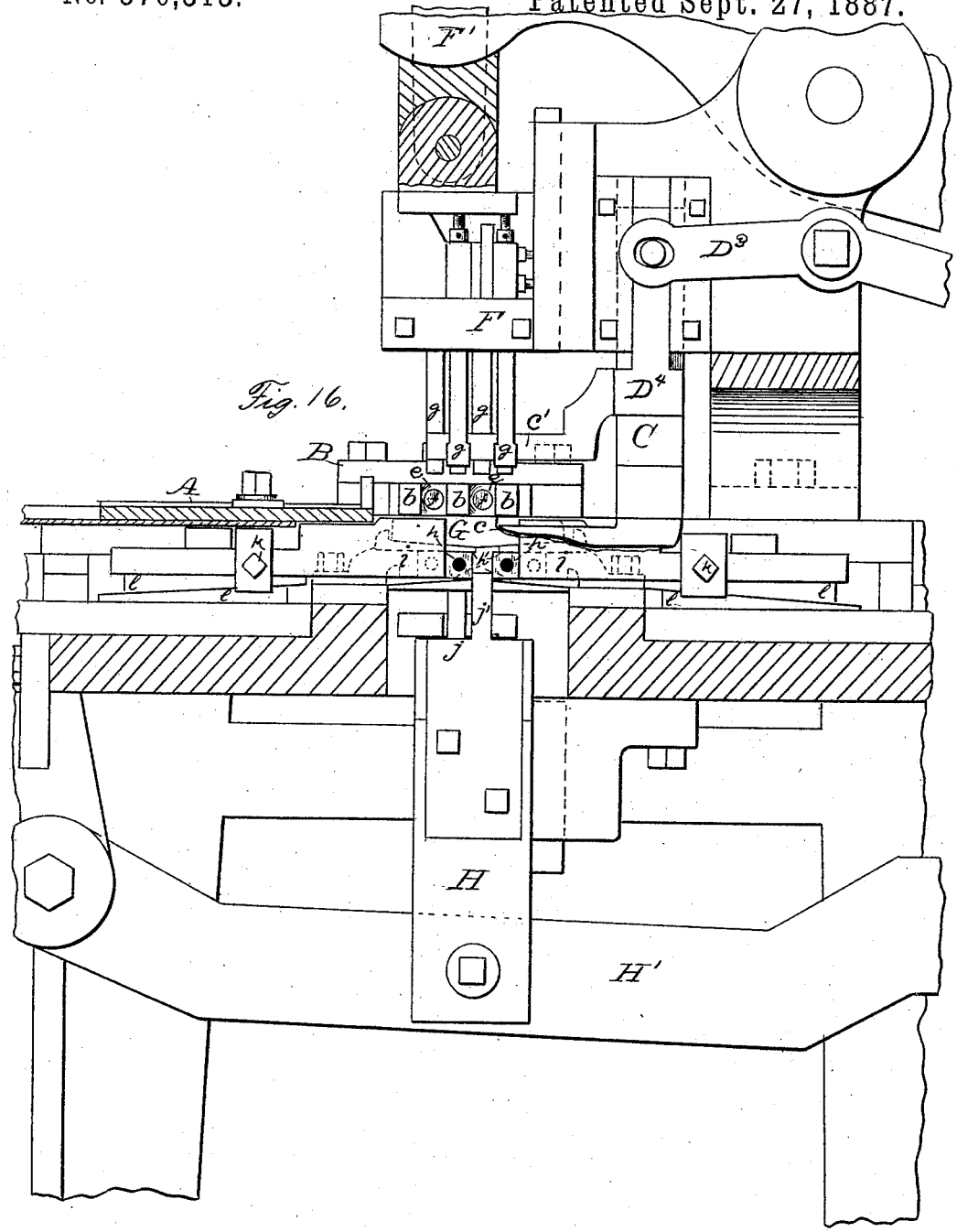

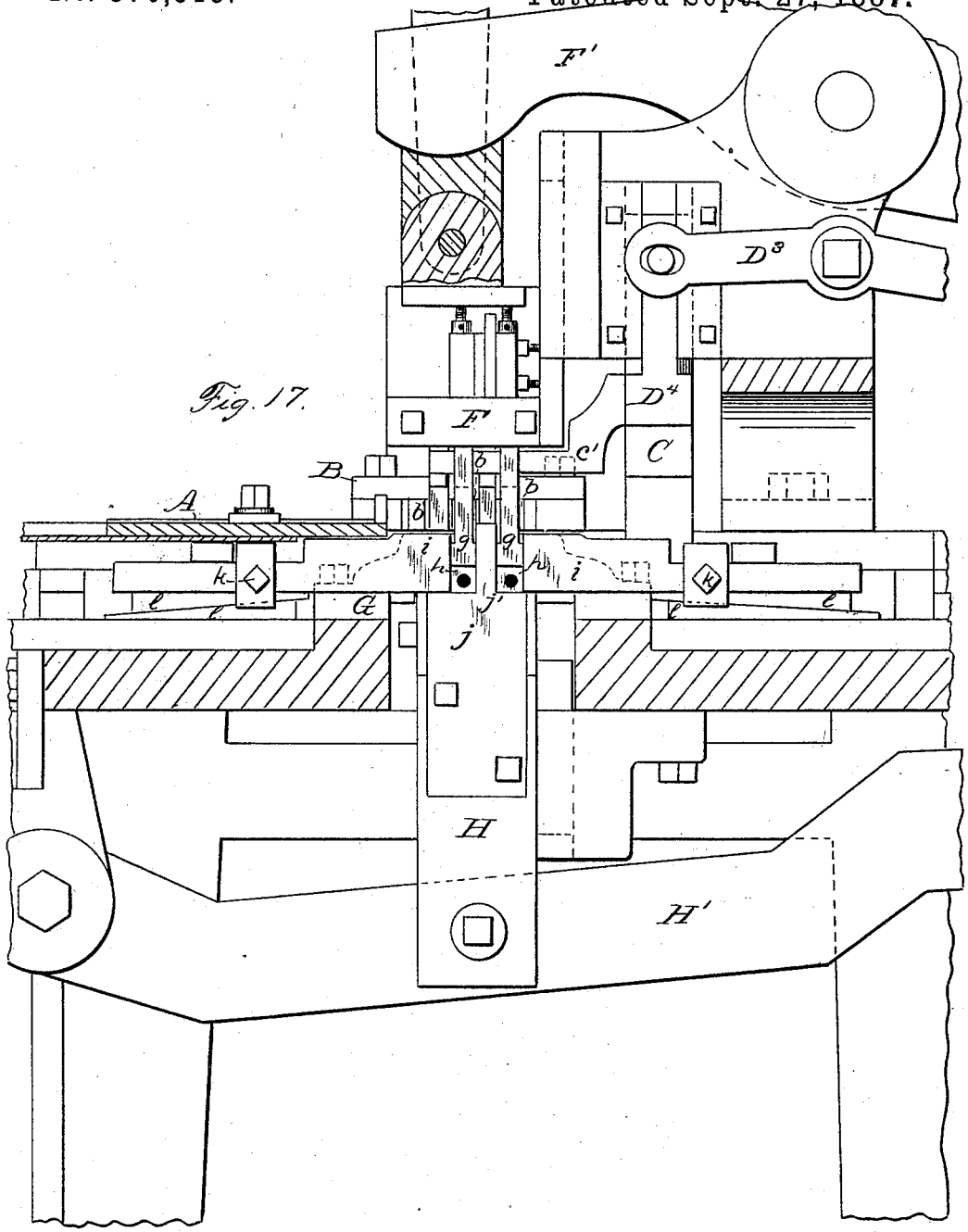

(No Model.)
9 Sheets—Sheet 9.
C. B. ANDERSSON.
NUT MACHINE.
No. 370,515. Patented Sept. 27, 1887.
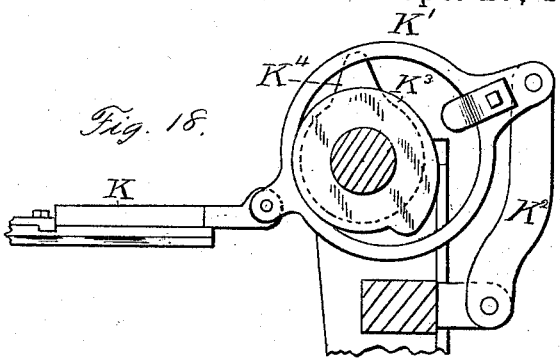
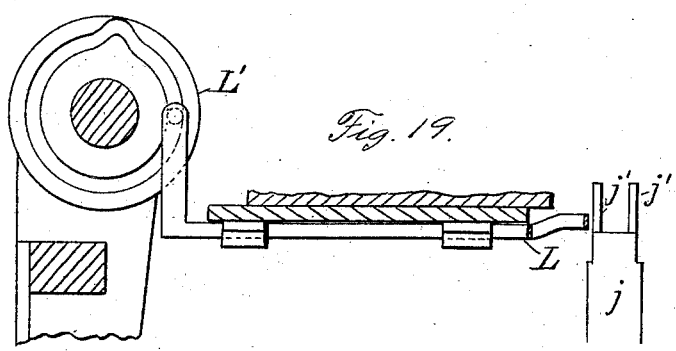
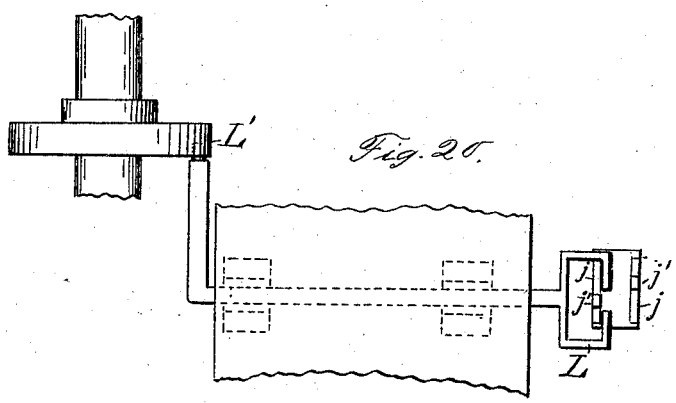
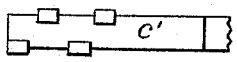
Witnesses.
John Edwards Jr.
C. A. Shepard.
Inventor.
Carl B. Andersson,
By James Shepard
Atty.

UNITED STATES PATENT OFFICE.

CARL B. ANDERSSON, OF UNIONVILLE, CONNECTICUT, ASSIGNOR TO MARY J. DUNHAM, OF SAME PLACE.

NUT-MACHINE.

SPECIFICATION forming part of Letters Patent No. 370,515, dated September 27, 1887.

Application filed June 4, 1885. Serial No. 167,668. (No model.)

*To all whom it may concern:*

Be it known that I, CARL B. ANDERSSON, a citizen of Sweden, residing at Unionville, in the county of Hartford and State of Connecticut, have invented certain new and useful Improvements in Nut-Machines, of which the following is a specification.

My invention relates to machines for making forged nuts, and in its operation I cut two or more nuts from a bar at one time, and the nuts so cut are crowned, hammered, and punched during their passage through the machine.

Figure 12:
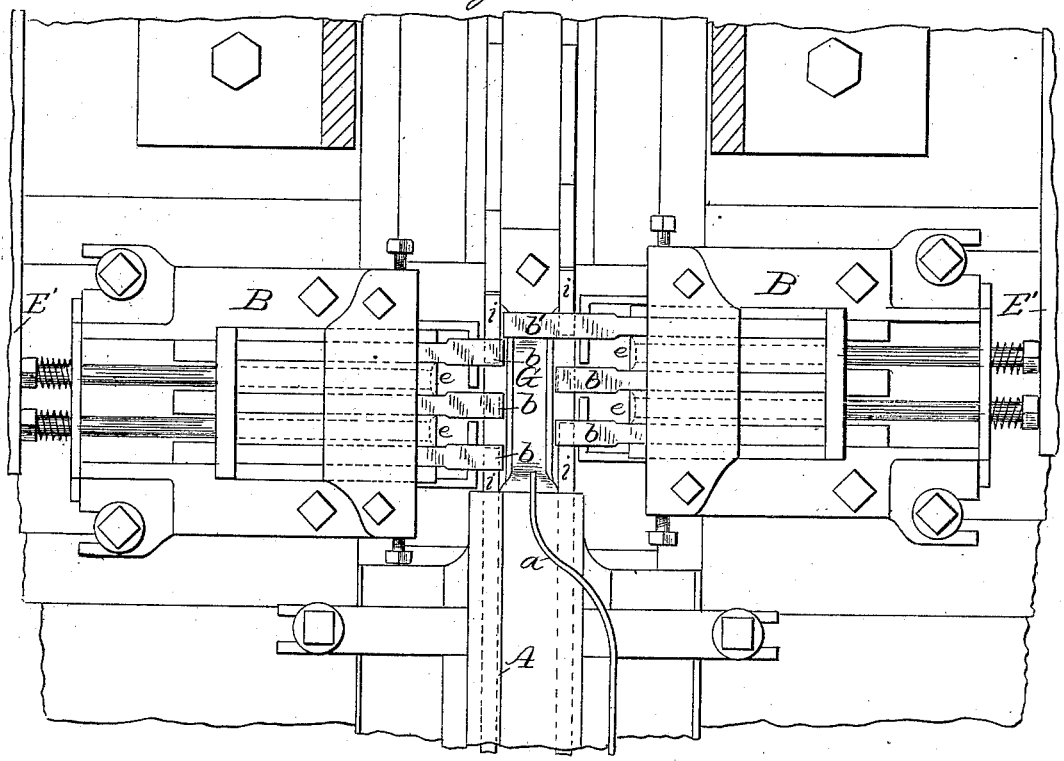
Figure 13:
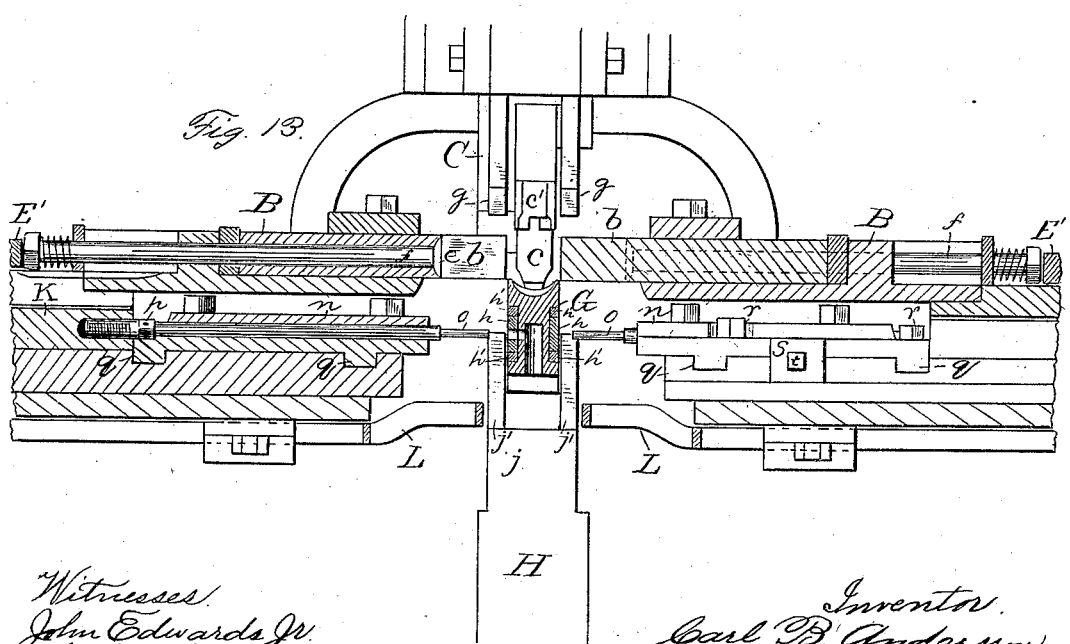
Figure 14:
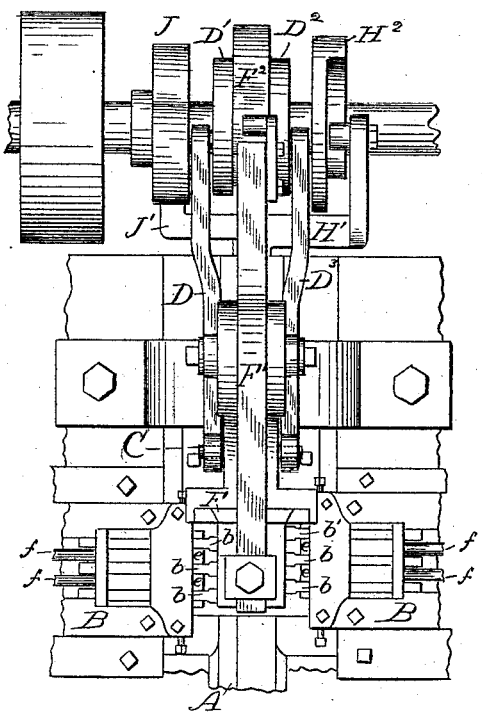
Figure 15:
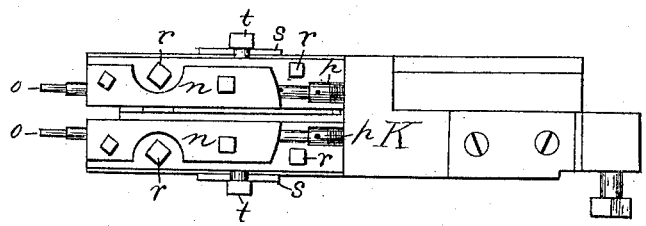

In the accompanying drawings, Figure 1 is a plan view, partly in horizontal section, showing the main portion of my machine. Fig. 2 is a front elevation of my machine. Fig. 3 is a side view of one of the cams which draw back the shear-slides. Fig. 4 is a side view of one of the cams which force the shear-slides forward. Fig. 5 is a vertical section of my machine on line $x \, x$ of Fig. 1. Fig. 6 is a side elevation of the die-bed and dies. Fig. 7 is a vertical section of the same on line $z \, z$ of Fig. 6. Fig. 8 is a vertical section of parts of the machine on line $y \, y$ of Fig. 1, the die-bed and dies being shown in elevation. Fig. 9 is a side view of the cam which operates the side hammers which are at the rear of the machine. Fig. 10 is a side view of one of the cams which operate the gages. Fig. 11 is a side view of the cam which drives the upper hammers. Fig. 12 is the central portion of Fig. 1 enlarged. Fig. 13 is the central portion of Fig. 5 enlarged. Fig. 14 is a plan view of the central portion of the machine. Fig. 15 is a plan view of one of the punch-slides. Fig. 16 is the central portion of Fig. 8 enlarged. Fig. 17 is a like view of the same with the parts represented in a different position—namely, with the hammers compressing the nut. Fig. 18 is a partial section and rear elevation of the mechanism for operating one of the punch-slides. Fig. 19 is a front elevation and partial section of one of the knock-offs and its operating mechanism. Fig. 20 is a plan view of the same, and Fig. 21 is a reverse plan view of the upper gage.

A bar of iron is placed between the stationary gage A and the spring $a$ (see Figs. 1 and 12) when its end is slid in between the shear-blades $b$. These blades are arranged in pairs within reciprocating slides B in such manner that one blade meshes into and fits the space between two adjoining blades.

As shown in the drawings, my machine is arranged for cutting four nuts from a bar at one time, and I therefore arrange three shear-blades in each slide B; but the rearmost blade, $b'$, is longer than the rest and serves as a gage for stopping the end of the bar when it is shoved backward between the shears. After the bar is thus placed in position the gages which bear upon its upper and lower edges move down and up, respectively, to center the bar between the shear-blades.

$c$ designates the gage which bears against the under side of the bar, which gage is mounted upon a vertically-reciprocating slide, C. The upper end of this slide is connected to a lever, D, Fig. 14, which is mounted upon an upright portion of the frame, while a pin on the other end of said lever engages the grooved cam D', a side view of which is shown in Fig. 10. A like cam, $D^2$, engages the lever $D^3$, the other end of which is connected with a vertical slide, $D^4$, for reciprocating said slide and the gage $c'$, which is attached to said slide and bears upon the upper edge of the bar. The under side of this gage is shown detached in the reverse plan view, Fig. 19. It is notched in the manner shown, in order to make room for the shear-blades to act while the solid portions on the face of the gage enter the spaces between said blades and properly bear against portions of the upper edge of the bar to gage it.

The shear-slides B B are moved forward—that is, toward each other—by means of cams $B^2$, each striking against a tail-piece, $d$, on the slides, as shown most clearly in Fig. 5. A detached side elevation of one of said cams is shown in Fig. 4. The shear-slides are drawn outward by means of cams $B^3$ (a side view of one of which is shown in Fig. 3) acting against the levers $B^4$, the swinging ends of which levers are connected with the slides by means of jointed and hooked bars $B^5$. So soon as the shears have obtained sufficient hold upon the bar to hold it in place without the assistance of the top and bottom gages, $c' \, c$, the shears stop for a moment, the gages retreat, and then the shears continue to move forward and carry in opposite directions the nuts which have been cut from the bar up against the crowning-dies, within which the nuts are swaged into a rounding or crowing form upon one side, the ends of the shear-blades acting as the punches, which thus force the nuts into the crowning-dies. For this reason I make the shear-blades a little wider up and down than the width of the nuts.

The crowning-dies $e$ are placed between the shear-blades $b$, and are securely fastened in place, so as to move with the shear-blades in the slides B. Inasmuch as the nuts spread somewhat in the act of crowning, I make the crowning-dies wider than the width of the nut when first cut from the bar, and in order to make room for these wide crowning-dies, and also to facilitate the discharge of the nuts when crowned, I form the shear-blades with narrow shanks—that is, shanks that are narrower than their cutting-faces—whereby the space between the blades just in front of the crowning-dies is wider than the space between the blades at their cutting-edges, the same as if the blades were cut away in front of said dies. The crowning-dies are bored through axially in order to receive the sliding knock-outs or rods $f$. Just as the shears start backward after crowning the nut the cams E strike the knock-out levers E', which, acting upon the ends of the knock-outs $f$, force said knock-outs against the crowning-face of the nuts to knock them out of the crowning-dies. The shears, however, instead of retreating the whole length of their stroke at once, retreat just far enough to allow the top hammers to pass down between the shear-blades at the cut-away portion and push the nuts down from between said blades. When the nuts are thus disengaged from between the shear-blades, they are immediately over the side and bottom hammers, ready to be received thereby. The end of the shear-blade, in connection with the sides of the two adjoining blades in the opposite set and the crowning-die, form a sort of a box or chute, through which the nut is thus forced downward by means of the top hammers, $g$, into position for hammering and punching. These upper hammers, $g$, are mounted in a vertically-moving slide, F, in the upper part of the press, and are moved up and down by means of the lever F', the tail of which is acted upon by means of the cam $F^2$, Figs. 1, 8, and 11.

In the middle portion of the machine, immediately under the point where the bar is placed between the shears, is a double-faced die-bed, G, in which the dies for cutting the central hole in the nuts are secured. An enlarged side view of this die-bed as detached from the machine is shown in Fig. 6. This die-bed is grooved upon each side to receive the die-blocks $h$ and their holding-wedges $h'$. This groove tapers from its middle portion outward, being the narrowest at the middle. I prefer to make the die-blocks with two die-holes in each, so that they may be changed end for end. The wedges and the groove in the bed are so tapered that when they are in position to clamp the die their confronting edges will be substantially parallel to each other, as shown in Fig. 6. By loosening these wedges the dies may be adjusted to and from each other, and by withdrawing one wedge a little and then driving in the other the dies may be adjusted up or down to any desired height, so that they may be used for punching nuts of different sizes.

Although I have shown two holes in each of the die-blocks $h$, only one hole in each block—namely, that nearest their confronting ends—will be used at the same time.

In the under side of the die-bed vertical holes are bored, and a horizontal hole is bored in alignment with the hole in the die through into this vertical hole, in order to provide for the discharge of slugs which are punched from the nuts. The opposite side of this die-bed, as clearly shown in Fig. 7, is provided with like die-blocks, $h$, adjustably secured therein by means of wedges, in the manner before described; but the dies are so set that the hole in the dies upon one side of the bed are opposite the middle point between two holes on the other side of the bed.

When the nuts are cut from the bar and carried in opposite directions by the shears, two of the nuts so cut are carried over the side and bottom hammers, $i\ j$, upon one side of this bed, while the other two are carried over to like hammers on the other side of this bed. The top hammers, $g$, are also spread apart, so that there are two of them upon each side of this bed when they are brought down.

The bottom hammers or anvils, $j$, are each provided with a central neck, $j'$, which separates the two nuts which are deposited upon each of said hammers or anvils, whereby said hammers each furnish an anvil-surface on each side of the central neck, against which the nut is swaged upon two of its side edges. These hammers are mounted upon a vertically-reciprocating slide, H, the lower end of which is connected with a lever, H', which lever is raised by means of the cam $H^2$. This cam has a concentric face, so that after it has raised the anvil or bottom hammers, $j$, to a given height it holds them there for a given time to allow for the operation of other parts—namely, the top, front, and rear hammers and the punch. The side hammers, $i$, which are placed, respectively, at the front and rear of the machine, and sometimes referred to as the "front" and "rear" hammers, are made adjustable toward the front and rear, and also up and down, to bring them to the proper height with reference to the top of the anvil, and are held in place, when so adjusted, by means of set-screws $k$ and wedges $l$. The wedges also serve to adjust said hammers up and down, as do the wedges which adjust the dies $h\ h$. These hammers are thus mounted in suitable slides, the front one of which, bearing two hammers, is forced toward the rear of the machine by means of the lever I and cam I', (see Figs. 1 and 2,) while the rear slide and its two hammers are forced toward the forward part of the machine by means of the cam J and the arm J', which connects it with the hammer-slide.

While the anvil $j$ is elevated into the position shown in Fig. 17 the top, front, and rear hammers are caused by their respective cams to come against the nut for pressing all four of its side edges, as shown in said figure. While the nuts are thus held between the several hammers the punch-slides are forced forward to make the central hole in the several nuts thus pressed. The anvil then drops out of the way, while the top hammers continue their downward movement and carry the nuts downward a little more than their width into position to be acted upon by the knock-offs, which throw the nuts out of the machine.

Returning now to the punch-slides for a more particular description, K designates said slides, the same being shown in detached plan view in Fig. 15. These slides each have a reciprocated motion imparted to them by means of the hinged yoke K', connecting-lever $K^2$, and cams $K^3 K^4$, the yoke being hinged at one end to the slide and at the other end to the connecting-lever $K^2$, while the lower end of said lever is hinged to the frame of the machine, the same being shown most clearly in Fig. 18. The cam $K^4$ acts by contact with the tail of the slide to drive said slide forward, while the cam $K^3$ acts against an arm, $m$, on the yoke to draw the slide backward. This operating mechanism for the slide upon one side of the machine is a duplicate of the operating mechanism for the slide upon the opposite side of the machine. These punch-slides are provided with adjustable punch-holders $n$ $n$, which holders are made in longitudinal halves bored out to receive the body of the punches $o$ and clamped together to hold the punches therein by means of screws. The ends of the punch-rods are backed by adjusting-screws $p$, which, by being screwed up against the punch-rods, will prevent them from slipping endwise in the holders during their forward stroke. Each of the holders is provided with transverse tenons or lugs $q$, which take into corresponding transverse slots in that part of the punch-slides K which forms the bed for the punch-holders, and the holders are held firmly in place upon said bed by means of screws $r$, Fig. 15, said screws passing through slots in the lower member of the punch-holders. Upon each side of the punch-holders, and rigidly secured to the base of the slide K, there are ears $s$, recessed upon their upper edge to embrace the adjusting-screw $t$ just under their head, as shown in Fig. 15. By loosening the bolts or set-screws $r$ and turning the adjusting-screws $t$ the punches $o$ in each may be adjusted laterally to bring the punches so as to strike centrally between the hammers, the dies being adjusted to correspond thereto.

Detached views of one of the knock-offs are shown in Figs. 19 and 20, the former being partly in front elevation and partly in section, while the latter is in plan view. The knock-offs L are fitted to slide in suitable guides upon the frame of the machine, and an arm from one end of each knock-off enters a groove in each of the cams L', which cams impart a quick forward and backward stroke to the knock-offs at each revolution. The knock-off proper is in the form of a rectangular frame left open at one side to allow it to pass into and out of position over the upper ends of the anvils or bottom hammers, $j$, the opening therein being made to allow the knock-offs to thus move by the central neck, $j'$, of the anvil or bottom hammer. In Fig. 19 the knock-off L is represented as drawn backward out of the way of the anvil, while in Fig. 20 it is represented as moved forward into position over the anvil, ready to have the nuts drop into it. These knock-offs move with a quick forward and back stroke at a time when the anvils are dropped, and during the working of the anvils they rise up through the knock-offs when the latter are in the position represented in Fig. 20. After the central hole in the several nuts is punched the anvils drop downward, while the upper hammers continue their downward movement and force the nuts down upon the anvils into the embrace of the knock-offs, which, upon their outward movements, pick the nuts from the anvils and allow them to fall from the machine, two nuts being carried by one knock-off to the right and two to the left by the other knock-off.

A brief statement of the operation of the machine is as follows: The bar is put in position between the shears and stopped in proper position by the longest shear-blade. Gages at the top and bottom edge then move down and up to center the bar. The shear-slides move toward each other, and so soon as these shears have a firm hold upon the bar they stop a moment and the gages for the top and bottom edges retreat out of the way. The shears then continue their movement, cutting off four nuts, carrying two to the right and two to the left, the ends of the shear-blades forcing the nuts into the crowning-dies to crown the nuts, and also carrying the nuts to the opposite sides of the die-bed into proper position to be further operated upon. The shears retreat enough to let the nuts out of the swage, and then stop for a moment to form a guide for the nuts. The knock-outs act to push the nuts from the swaging-dies. The top hammers are forced downward upon the nuts and force them out from between the shear-blades and down into position on the bottom hammers or anvils, the latter being raised up and stopped in position ready to receive them. The top hammers and the two front and rear hammers then act to hammer the edges of the nuts, and while the nuts are held by said hammers the punches act to cut the central hole. The anvils then drop, the top hammers continue their downward movement to carry the nuts down into the knock-offs and then retreat, and the knock-offs move back to pick the nuts from the anvils and discharge them from the machine, and then immediately return to their former position.

I claim as my invention—

1. In a machine for making nuts, the two sets of shear-blades and the interposed crowning-dies, the latter of a lateral width greater than the space between the shear-blades at their cutting end, and with a space of like width immediately in front of the crowning-dies, substantially as described, and for the purpose specified.

2. The combination of the two sets of shear-blades, mechanism for operating said blades, the top and bottom gages for acting upon the edges of the bar to be cut, and mechanism for operating said gages, substantially as described, and for the purpose specified.

3. The combination of the two sets of shear-blades, the crowning-dies placed between said blades, the top hammers set to move between said blades in front of the crowning-dies, and mechanism for operating said parts, substantially as described, and for the purpose specified.

4. The combination of the two sets of shear-blades, a die-bed centrally located with reference to the cutting-point of said blades, hammers upon each side of said bed for acting upon the edges of the nuts, and mechanism for operating said shear-blades and hammers, substantially as described, and for the purpose specified.

5. The combination of the two sets of shear-blades, a die-bed centrally located with reference to the cutting-point of said blades, and provided with punching-dies, hammers upon each side of said bed for acting upon the edges of the nuts, punches upon opposite sides of said bed set to correspond with the dies therein, and mechanism for operating said shear-blades, hammers, and punches, substantially as described, and for the purpose specified.

6. The combination of the bottom hammer or anvil, $j$, having central neck, the front and rear hammers, $i\ i$, the top hammers, $g\ g$, and their operating mechanism, substantially as described.

7. The combination of the bottom hammer or anvil, a side hammer adapted to move over the face of said anvil, and mechanism for adjusting said side hammer transversely to its line of movement, substantially as described, and for the purpose specified.

8. In a machine for making nuts, the die-bed having the dies $h\ h$, made adjustable to and from each other and also transversely to the line of said adjustment, substantially as described, and for the purpose specified.

9. The combination of the die-bed G, the top and side hammers, $g\ i$, anvil $j$, and mechanism for operating said anvil and hammers, substantially as described, and for the purpose specified.

10. The combination of the die-bed G, the top and side hammers, $g\ i$, the anvil $j$, the knock-off L, and mechanism for operating said knock-off, anvil, and hammers, substantially as described, and for the purpose specified.

11. The combination of the punch-slide with the punch-holders $n\ n$ and mechanism for adjusting said punch-holders laterally, substantially as described, and for the purpose specified.

CARL B. ANDERSSON.

Witnesses:
FRED B. BARNES,
GEO. M. DUNHAM.